(12) United States Patent
Uemura et al.

(10) Patent No.: US 7,757,368 B2
(45) Date of Patent: Jul. 20, 2010

(54) INSTALLATION DEVICE AND INSTALLATION METHOD FOR PISTON RING

(75) Inventors: Shigeru Uemura, Tokyo (JP); Hiroyasu Ikeda, Tokyo (JP)

(73) Assignee: Hirata Corporation, Tokyo (JP)

( * ) Notice: Subject to any disclaimer, the term of this patent is extended or adjusted under 35 U.S.C. 154(b) by 1156 days.

(21) Appl. No.: 10/572,919

(22) PCT Filed: Dec. 12, 2003

(86) PCT No.: PCT/JP03/15936

§ 371 (c)(1),
(2), (4) Date: Mar. 21, 2006

(87) PCT Pub. No.: WO2005/056999

PCT Pub. Date: Jun. 23, 2005

(65) Prior Publication Data

US 2007/0056162 A1 Mar. 15, 2007

(51) Int. Cl.
*B23P 11/02* (2006.01)
*B23P 15/10* (2006.01)
(52) U.S. Cl. .................... 29/450; 29/453; 29/222; 29/224; 29/235; 29/269; 29/888.044; 29/791
(58) Field of Classification Search .......... 29/222, 29/223, 224, 229, 235, 269, 791, 783, 809, 29/888.044, 450, 451, 453
See application file for complete search history.

(56) References Cited

U.S. PATENT DOCUMENTS 2,792,625 A * 5/1957 Hoffman ............... 29/453
3,793,695 A * 2/1974 Carter et al. ........... 29/717
4,047,276 A * 9/1977 Albers ................... 29/222

(Continued)

FOREIGN PATENT DOCUMENTS

EP 0 526 329 2/1993

(Continued)

OTHER PUBLICATIONS

Microfilm of the specification and drawings annexed to the request of Japanese Utility Model Application No. 28634/1987 (Laid-open No. 136829/1988) (Toyota Motor Corp.), Sep. 8, 1988, Full text; Figs. 1 to 3 (Family: none).

*Primary Examiner*—Essama Omgba
(74) *Attorney, Agent, or Firm*—Wenderoth, Lind & Ponack, LLP.

(57) ABSTRACT

An installation device includes an extruding mechanism that horizontally extrudes a piston ring, positions the piston ring and, after extruding, is driven downwardly and then returned to a waiting position; a ring holding mechanism that has a guide passage for guiding the piston ring, that is driven so as to move close to and apart from a piston in one direction perpendicular to the extruding direction, and that is capable of defining an insertion hole for insertion of the piston; a ring diameter extending mechanism that extends the diameter of the piston ring, that is driven to enter and leave the guide passage of the ring holding mechanism, and that is reversely driven to a position for defining a part of the guide passage when the diameter-extended state of the piston ring is released; and a piston holding member that holds the piston at a predetermined position.

8 Claims, 18 Drawing Sheets

U.S. PATENT DOCUMENTS

| | | | |
|---|---|---|---|
| 4,967,459 A * | 11/1990 | Garnier | 29/222 |
| 5,259,109 A | 11/1993 | Fefeu et al. | |
| 5,303,465 A * | 4/1994 | Fujimoto et al. | 29/791 |
| 5,404,629 A | 4/1995 | Liechty et al. | |
| 5,592,740 A * | 1/1997 | Liechty et al. | 29/888.044 |
| 2006/0123610 A1 * | 6/2006 | Haratake | 29/222 |

FOREIGN PATENT DOCUMENTS

| | | |
|---|---|---|
| FR | 2 679 812 | 2/1993 |
| JP | 05-220631 | 8/1993 |
| JP | 2003-094257 | 4/2003 |

* cited by examiner

FIG.1A - PRIOR ART
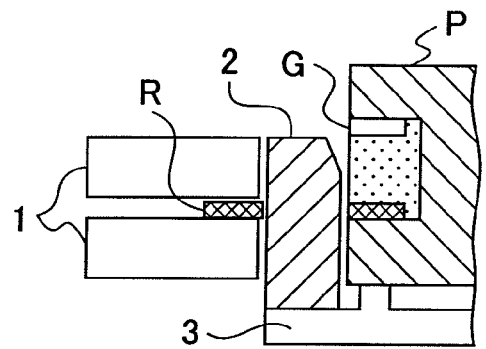
FIG.1B - PRIOR ART
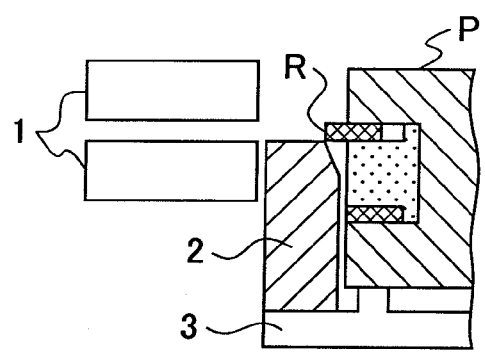
FIG.1C - PRIOR ART
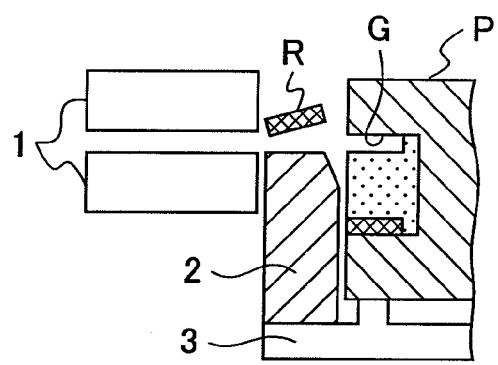

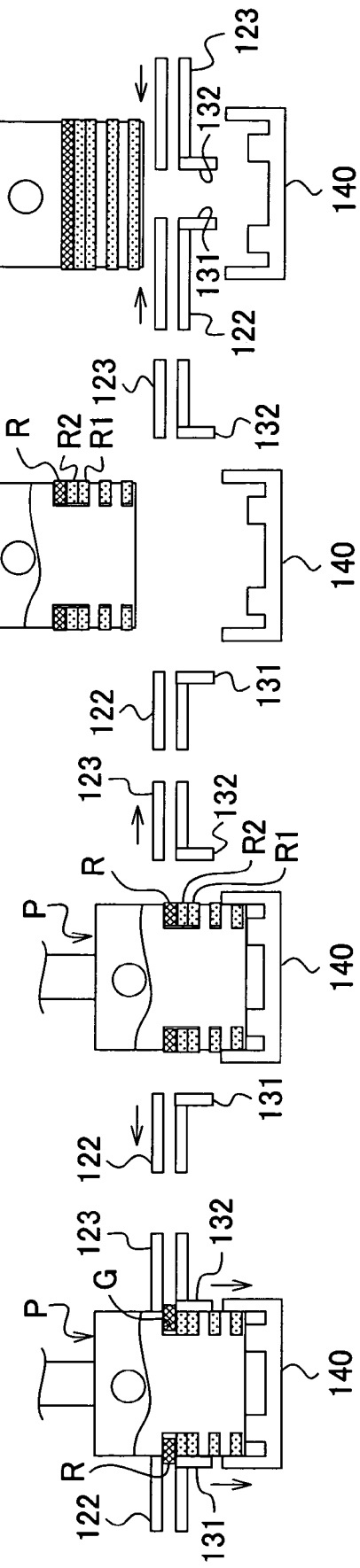

INSTALLATION DEVICE AND INSTALLATION METHOD FOR PISTON RING

TECHNICAL FIELD

This invention relates to a device and a method for installing a piston ring onto a piston of an internal combustion engine, and more particularly, to a device and a method for supplying and installing a piston ring from a horizontal direction onto a piston suspended and held downwardly in a vertical direction.

BACKGROUND ART

A piston reciprocating in a cylinder bore of an internal combustion engine has a plurality of ring grooves (for example, three ring grooves). For example, two compression rings (chiefly, a first ring that seals a combustion gas and a secondary ring that seals the combustion gas and adjusts a lubricant film) used to prevent a combustion gas from blowing through and an oil ring consisting of a plurality of components (i.e., two rail rings and an expander ring) to adjust the lubricant film are fitted in these ring grooves. A connecting rod is swingably connected to the piston.

As a conventional ring-installing device for installing especially the oil ring among these piston rings, there is known an installation device made up of a magazine that holds a plurality of rings (rail rings) by stacking up the rings in a vertical direction; a ring extruding mechanism made up of a first slide member that is driven in a horizontal direction in order to horizontally extrude a ring occupying the lowest position among the rings stacked up on the magazine, a second slide member that is carried on the first slide member and is driven in an oblique direction, and an extruding member fixed to the second slide member; a ring guide member (ring nest member) that guides the extruded ring to a predetermined position in the horizontal direction and that includes a plurality of tabular members driven and reciprocated synchronously in a radial manner; a ring diameter extending member including a plurality of ring expanding fingers driven and reciprocated synchronously in a radial manner in order to extend the diameter of the ring set at the predetermined position; and a piston holding member that holds the piston at a predetermined position and that is driven and reciprocated in upward and downward directions together with the ring diameter extending member (see U.S. Pat. No. 5,404,629, for example).

However, in the conventional installation device, a reaction force produced when the extruding member of the ring extruding mechanism extrudes the ring acts obliquely with respect to a direction in which the second slide member is slid, i.e., acts to deviate slide surfaces facing in parallel with each other from the mutually parallel state. Therefore, there is a risk that functional reliability will be lowered. Additionally, the extruding member is positionally adjusted to the lowest ring by driving the second slide member in the oblique direction, and, in addition, the influence of a time-dependent change is caused by the action of the reaction force. Therefore, there is a risk that positioning cannot be performed with high accuracy.

Additionally, in the conventional installation device, the ring guide member and the ring diameter extending member are radially reciprocated, and hence the structure becomes complex, and the device is increased in size.

Still additionally, when the ring R is fitted into the ring groove G of the piston P, the ring R guided by the ring guide member 1 to the predetermined position in the horizontal direction is expanded by the ring expanding finger 2 as shown in FIG. 1A to FIG. 1C, and the piston P is placed on the holding member 3. The holding member 3 and the ring expanding finger 2 are then lowered together by a predetermined amount. As a result, the ring R is elastically recovered, and the diameter of the ring R is narrowed so that the ring R can enter the ring groove G.

At this time, a space above an interval between the ring guide member 1 and the piston P is not constrained and is free. Therefore, there is a risk that the ring R will be disengaged from the ring groove G as shown in FIG. 1C, and cannot be reliably fitted thereinto when the ring R is shaped like a wave.

The present invention has been made in consideration of the circumstances of the conventional technique. It is therefore an object of the present invention to provide an installation device and an installation method for a piston ring capable of reliably fitting a piston ring into a ring groove of a piston while simplifying the structure of the device so as to reduce the size thereof.

DISCLOSURE OF THE INVENTION

The piston ring installation device of the present invention that achieves the object includes an extruding mechanism that horizontally extrudes a piston ring occupying a lowest position among piston rings held and stacked up and then positions the extruded piston ring at a predetermined position and that is driven downwardly in a vertical direction by a predetermined amount after extruding the piston ring and is then driven to return to a waiting position; a ring holding mechanism that has a guide passage used to guide the piston extruded by the extruding mechanism while holding the piston ring in such a way as to sandwich the piston ring from upward and downward directions, that is driven so as to move close to and apart from a piston in one direction intersecting with an extruding direction, and that is capable of defining an insertion hole into which a piston is inserted in a center area thereof; a ring diameter extending mechanism that extends the diameter of the piston ring held by the ring holding mechanism while being in contact with an inner surface of the piston ring, that is driven to freely enter and leave the guide passage defined by the ring holding mechanism, and that is driven to recede toward a position defining a part of the guide passage when an extended state of the piston ring is released; and a piston holding member that holds the piston inserted into the insertion hole at a predetermined position.

According to this structure, when the extruding mechanism extrudes a lowest piston ring and returns to the waiting position, the extruding mechanism is pre-driven downwardly in the vertical direction. Therefore, the extruding mechanism can avoid coming into contact with a piston ring waiting for the next processing at the lowest part of the magazine, and hence the piston ring held by the magazine can be prevented from, for example, being deviated. Additionally, since the extruding mechanism is driven in the horizontal direction and in the vertical direction, the structure can be made simpler than if driven in the oblique direction, and a fine adjustment can be easily performed for the height position of the extruding mechanism with respect to a piston ring, thus making it possible to perform highly accurate positioning. Still additionally, since the ring holding mechanism is reciprocated only in one direction, the structure can be simplified, and the device can be reduced in size. Still additionally, since the ring diameter extending mechanism can freely enter and leave the guide passage formed by the ring holding mechanism, the guide passage of the piston ring is always maintained (secured) more reliably than if disposed in a free space lying between the guide passage and the piston (a free space lying between the guide passage formed by being interrupted midway and the piston) as in the conventional technique. Hence, the piston ring can be reliably fitted into the ring groove without being deviated from the normal position.

In the above-mentioned installation device, the extruding mechanism can include a push-out member that pushes out a piston ring occupying a lowest position among piston rings stacked up, a horizontally driving mechanism that drives and reciprocates the push-out member in a horizontal direction, and a vertically driving mechanism that drives and reciprocates the push-out member in a vertical direction.

According to this structure, the push-out member is driven by the horizontally driving mechanism and pushes out the lowest piston ring. Thereafter, the push-out member is driven by the vertically driving mechanism downwardly in the vertical direction by a predetermined amount, and is then allowed to recede therefrom by the horizontally driving mechanism, and is again returned to a predetermined height position (waiting position) by the vertically driving mechanism. Thus, the control sequence and the structure can be simplified.

In the above-mentioned installation device, the push-out member can have a groove, which is used to receive a piston ring, formed in an upper surface of a forward end thereof.

According to this structure, the push-out member pushes out (cuts out) the lowest piston ring in a state of putting the lowest piston ring in the groove formed in the upper surface of the forward end thereof, and hence the piston ring is reliably pushed out (cut out) without being disengaged therefrom.

In the above-mentioned installation device, the ring holding mechanism can include a pair of guide plates that are disposed to face each other in a direction perpendicular to the extruding direction in which a piston ring is extruded and that have guide surfaces, respectively, defining substantially semicircle inside edge parts at end surfaces facing each other and defining the guide passage while facing each other in upward and downward directions with a predetermined interval therebetween; and a first driving mechanism that drives the pair of guide plates so as to move close to each other and apart from each other in one direction.

According to this structure, the pair of guide plates hold and guide the piston ring by the upper and lower guide surfaces so as to prevent the piston ring from being deviated. When the diameter of the piston ring is extended, and the extended state of the piston ring is released, the pair of guide plates are driven to move close to each other and apart from each other by the first driving mechanism. Thus, the ring holding mechanism includes the pair of guide plates driven only in one direction, and hence the structure can be simplified, and the device can be reduced in size.

In the above-mentioned installation device, each of the pair of guide plates can include an upper plate that forms an upper guide surface used as a part of the guide passage and an upper inside edge part used as a part of the insertion hole and a lower plate that forms a lower guide surface used as a part of the guide passage and a lower inside edge part greater in radius of curvature than the upper inside edge part, and the ring diameter extending mechanism can include a pair of diameter extending members that are capable of coming into contact with the upper guide surfaces of the upper plates, that are disposed adjacent to the lower edge parts of the lower plates so as to define a part of the insertion hole while being flush with the upper inside edge parts, that are supported so as to be movable in a direction in which the pair of guide plates are moved close to and apart from each other, and that are supported so as to be able to protrude and retreat from the lower guide surface; a second driving mechanism that drives the pair of diameter extending members so as to move close to and apart from each other; and a third driving mechanism that drives the pair of diameter extending members so as to protrude and retreat from the guide surface in a direction perpendicular to the guide surface.

According to this structure, the piston ring is slid between the upper guide surface and the lower guide surface respectively formed on the pair of guide plates, and is held at a predetermined position. Thereafter, the third driving mechanism raises the pair of diameter extending members so as to bring the upper end part thereof into contact with the upper guide surface. Thereafter, the second driving mechanism drives the pair of diameter extending members so as to move apart from each other in one direction synchronously with the pair of guide plates, and, as a result, the diameter of the piston ring is extended. After the piston is held by the piston holding member, the third driving mechanism allows the pair of diameter extending members to recede from the lower guide surface or to recede so as to open the guide passage. Accordingly, the piston ring is elastically recovered and enters the ring groove while being guided by the guide passage surrounded by the upper guide surface and the upper end part of the diameter extending member. Thus, the pair of diameter extending members are driven only in one direction, and hence the structure can be simplified, and the device can be reduced in size.

In the above-mentioned installation device, the second driving mechanism can be used also as the first driving mechanism.

According to this structure, the pair of diameter extending members and the pair of guide plates are driven to simultaneously move close to each other and apart from each other by the second driving mechanism, and hence the structure can be made simpler, and the device can be made smaller in size than are driven by mutually different driving mechanisms. Additionally, the diameter extending members and the guide plates can be driven exactly synchronously.

In the above-mentioned installation device, the pair of diameter extending members can include upper end parts that are formed to be engaged with the upper plates and that define slanting surfaces used to guide a piston ring toward a ring groove.

According to this structure, even when a slight gap is produced between the guide passage and the piston ring, the slanting surface of the upper end part guides the piston ring to the ring groove with high accuracy, and hence the piston ring is reliably fitted into the ring groove.

An installation method for a piston ring that achieves the object includes an extruding step of extruding a lowest piston ring, which occupies a lowest position among piston rings held and stacked up, by means of a push-out member along a guide passage toward a predetermined position in a horizontal direction and pre-moving the push-out member downwardly in a vertical direction by a predetermined amount when the push-out member is returned to a waiting position; a ring diameter extending step of, following the extruding step, extending a diameter of the piston ring held in such a way as to be sandwiched from upward and downward directions by means of a diameter extending member; a piston positioning step of, following the ring diameter extending step, positioning a ring groove of a piston at a predetermined position; and a ring inserting step of, following the piston positioning step, allowing the diameter extending member to recede from the guide passage so as to release an extended state of the piston ring and inserting the piston ring into the ring groove while the piston ring is guided by the surrounded guide passage.

According to this structure, in the extruding step, the push-out member is pre-driven downwardly in the vertical direction when the push-out member returns to the waiting position after extruding a lowest piston ring. Therefore, the push-out member can avoid coming into contact with a piston ring waiting for the next processing at the lowest part of the magazine, and hence the piston ring held by the magazine can be prevented from, for example, being deviated. Additionally, since the extruding step is performed to drive the push-out member in the horizontal direction and in the vertical direction, compared to the case that the push-out member is driven in the oblique direction, a fine adjustment can be easily performed for the height position of the push-out member with respect to a piston ring, thereby making it possible to perform highly accurate positioning. Still additionally, in the ring diameter extending step, since the piston ring is extended by driving the diameter extending member only in one direction, the sequence that controls the operations can be simplified. Still additionally, in the ring inserting step, since a state in which the surrounded guide passage is always maintained is reached, even when the diameter extending member recedes from the guide passage, the piston ring is reliably fitted into the ring groove without being deviated.

BRIEF DESCRIPTION OF DRAWINGS

FIG. 1A to FIG. 1C are operational views, each showing an installing operation in a conventional piston-ring-installing device;

FIG. 15A to FIG. 15D are operational views, each showing an operation in which a piston ring is installed into a ring groove of a piston;

DETAILED DESCRIPTION OF THE INVENTION

Preferred embodiments of the present invention will be hereinafter described with reference to the drawings.

Figure 2:
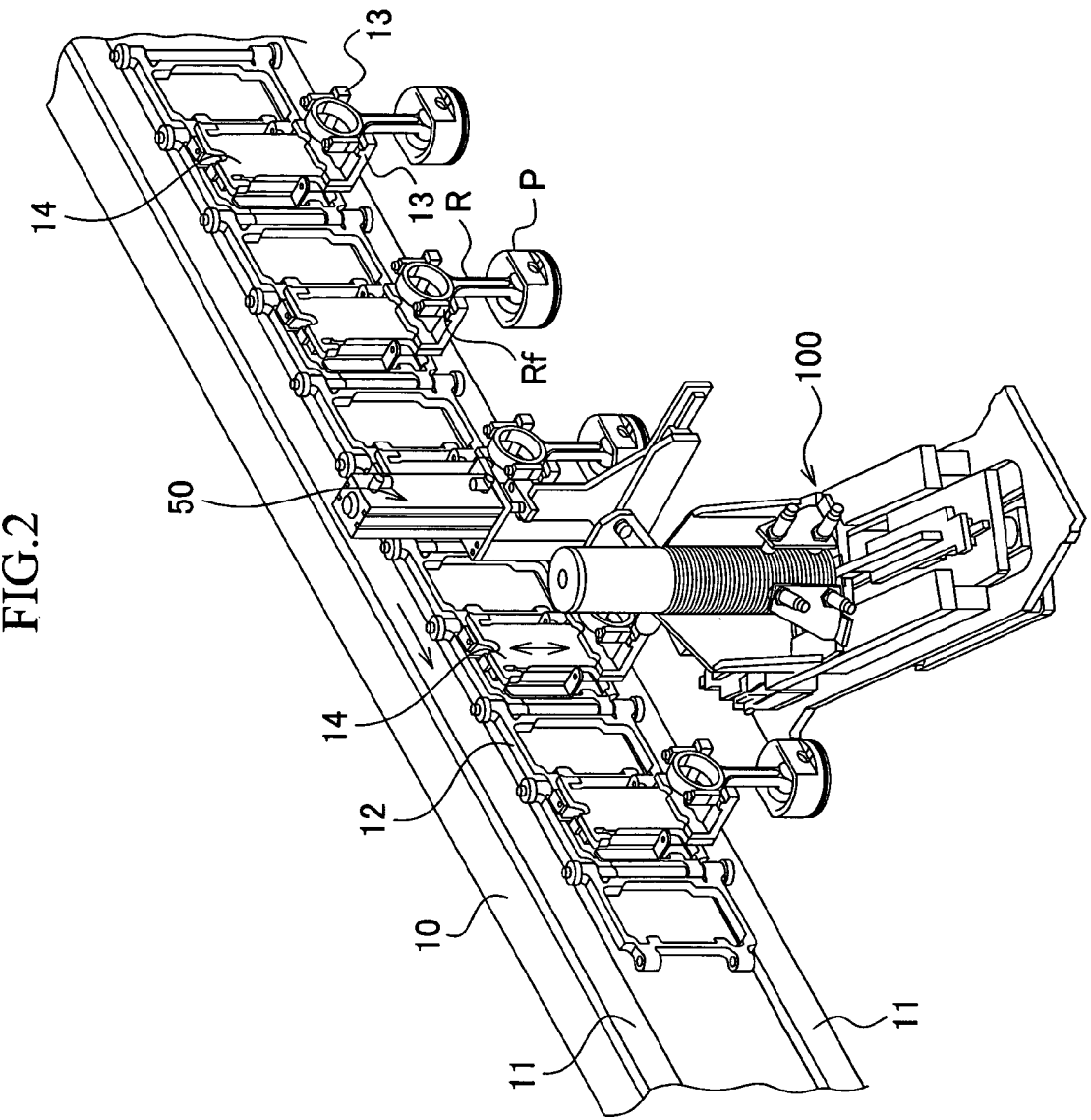
FIG. 2 is an external perspective view showing a part of an engine assembly line into which a piston-ring-installing device according to the present invention is incorporated.

As shown in FIG. 2, a system for installing a piston ring is made up of a frame 10, guide rails 11 disposed to horizontally extend in parallel with the frame 10, a conveyer 12 guided along the guide rails 11, and a piston-ring-installing device 100 that is disposed in a lower area of the conveyer 12 and that is provided integrally with an elevating mechanism 50 for raising and lowering a piston to be set at a position whereat a piston ring is fitted onto the piston.

An oil ring consists of two rail rings and an expander ring, and, in this embodiment, such rail rings are to be installed as piston rings.

The conveyer 12 is used to convey a piston P, to which a connecting rod R is connected, from a processing step performed on the upstream side in the flow of a sequence of operations to this installing step, and, after completing the installing step, continuously convey the piston P to a processing step performed on the downstream side. As shown in FIG. 2, the conveyer 12 has a plurality of pairs of holding arms 13 spaced with predetermined intervals, in order to position and hold flange parts Rf of the connecting rod R.

As shown in FIG. 2, the pair of holding arms 13 support the flange parts Rf of the connecting rod R from below outside the flange parts Rf, and hold the piston P in a state in which the piston P is suspended downwardly in the vertical direction (Z direction) (so as to direct a head of the piston P downwardly). The pair of holding arms 13 are fixed to a movable plate 14 reciprocatively supported in the vertical direction (Z direction) with respect to the conveyer 12. The movable plate 14 is upwardly urged by, for example, a spring, etc., and is stopped at an upper movement end while holding the piston P.

Figure 3:
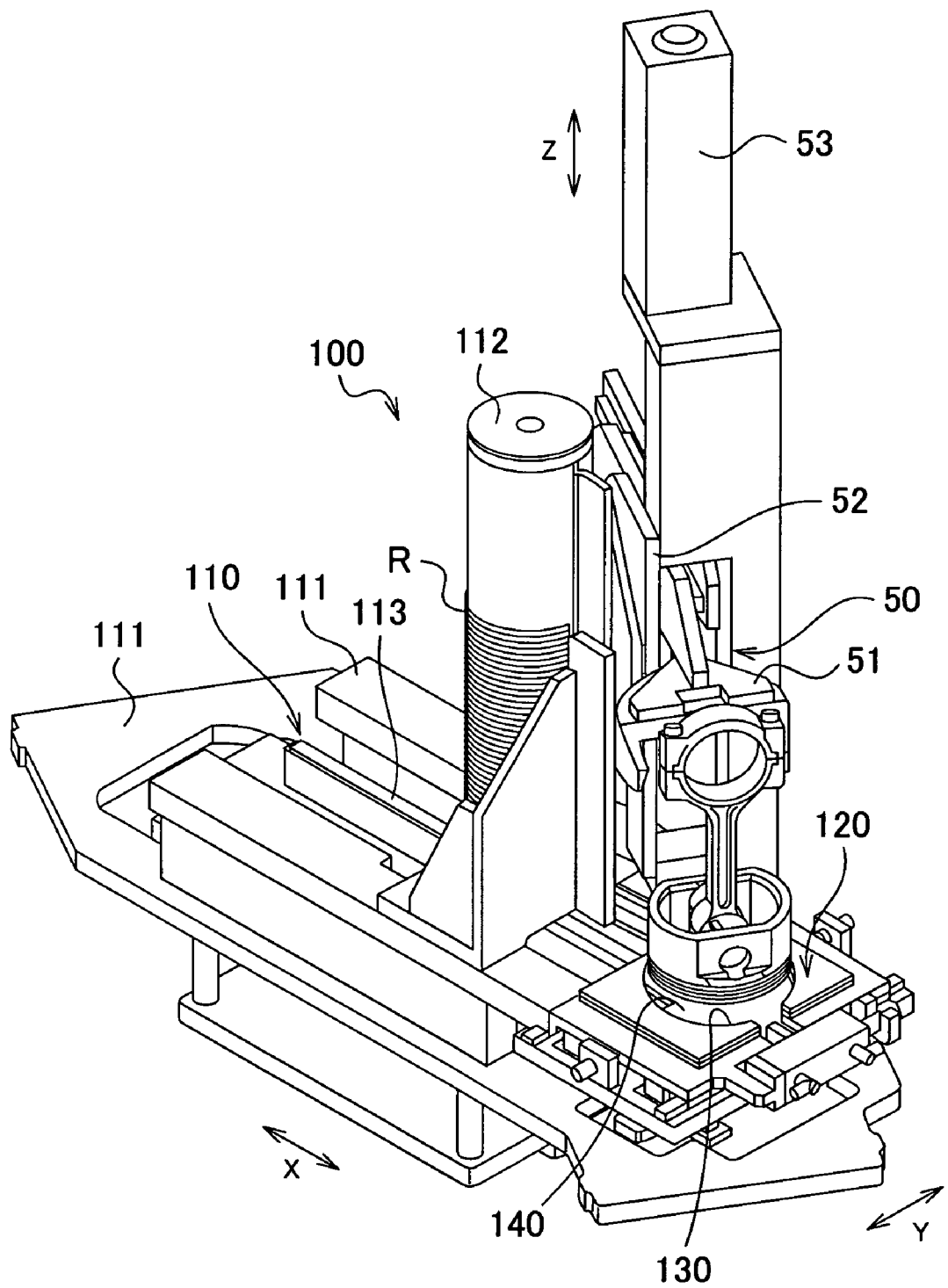
FIG. 3 is an external perspective view of the piston-ring-installing device according to the present invention.

As shown in FIG. 3, the elevating mechanism 50 is made up of a piston pressing member 51 that depresses the piston P while being in contact with the upper end edge of the piston P, a cam member 52 that brings the piston pressing member 51 close to the piston P obliquely from above and then moves the piston pressing member 51 downwardly in the vertical direction, and a driving mechanism 53 that includes an actuator, etc.

As shown in FIG. 3, the piston-ring-installing device 100 is made up of an extruding mechanism 110 that extrudes a lowest piston ring in the horizontal direction X among a plurality of piston rings stacked up in the vertical direction Z and positions the piston ring at a predetermined position, a ring holding mechanism 120 that holds the extruded piston ring while guiding the piston ring, a ring diameter extending mechanism 130 that extends the diameter of the piston ring held by the ring holding mechanism 120, and a piston holding member 140 that holds the piston at a predetermined position when the piston ring is installed onto the piston.

As shown in FIG. 3 to FIG. 6, the extruding mechanism 110 is made up of a base 111, a magazine 112 that is fixed to the base 111 and is elongated in the vertical direction Z, a push-out member 113 that pushes out a lowest piston ring R, which is the one of a plurality of piston rings R stacked up on the magazine 112, in the horizontal direction (i.e., in the extruding direction X), a connection member 114 connected to the push-out member 113, a guide plate 115 that guides the connection member 114 (and, in addition, the push-out member 113) in the horizontal direction (extruding direction X), a horizontally driving mechanism 116 that drives and reciprocates the connection member 114 (and, in addition, the push-out member 113) in the horizontal direction X, and a vertically driving mechanism 117 that drives and reciprocates the connection member 114 (and the push-out member 113) and the guide plate 115 in the vertical direction Z with respect to the base 111.

Figure 4:
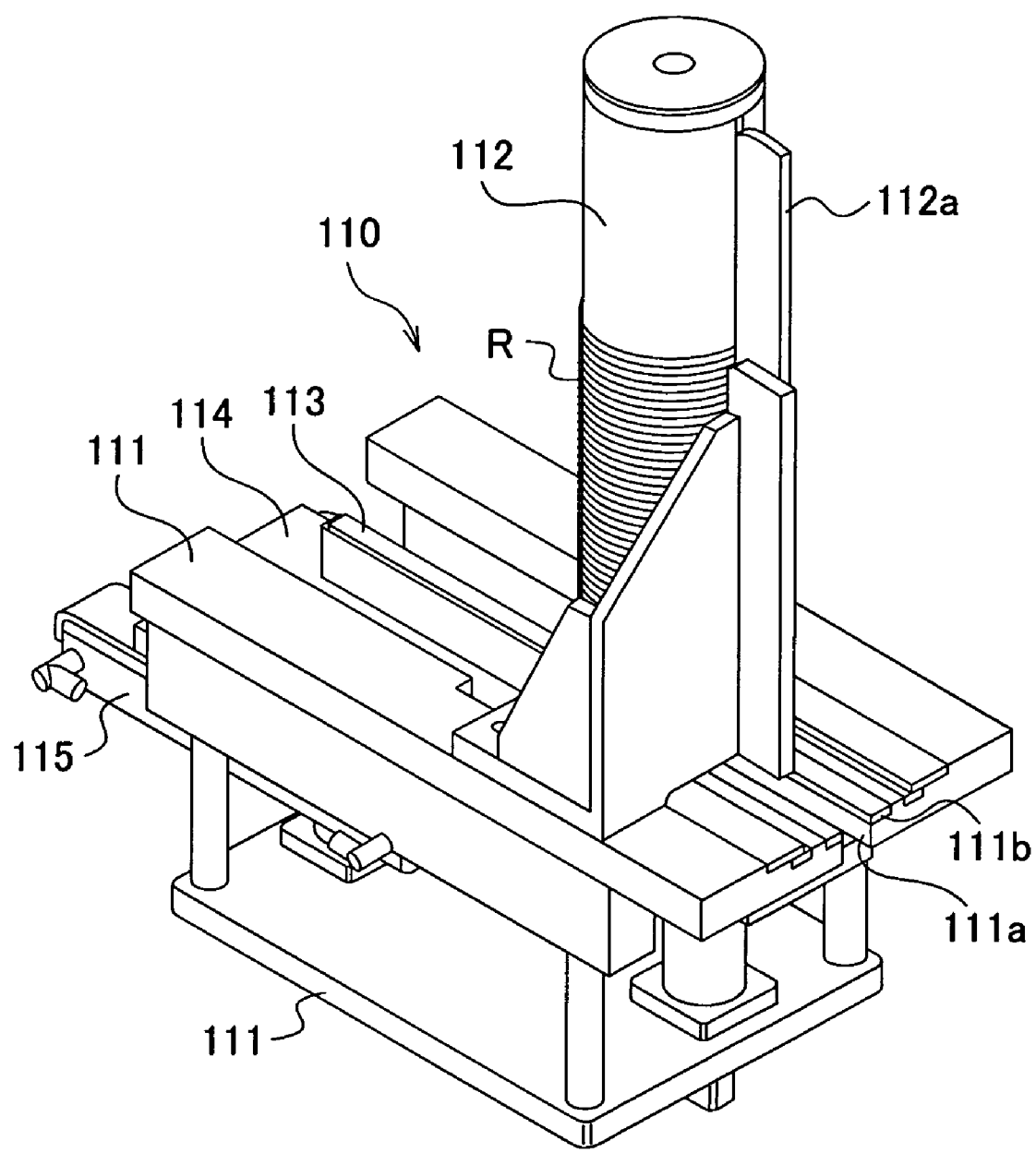
FIG. 4 is a perspective view showing an extruding mechanism that is a component of the device according to the present invention.
Figure 5:
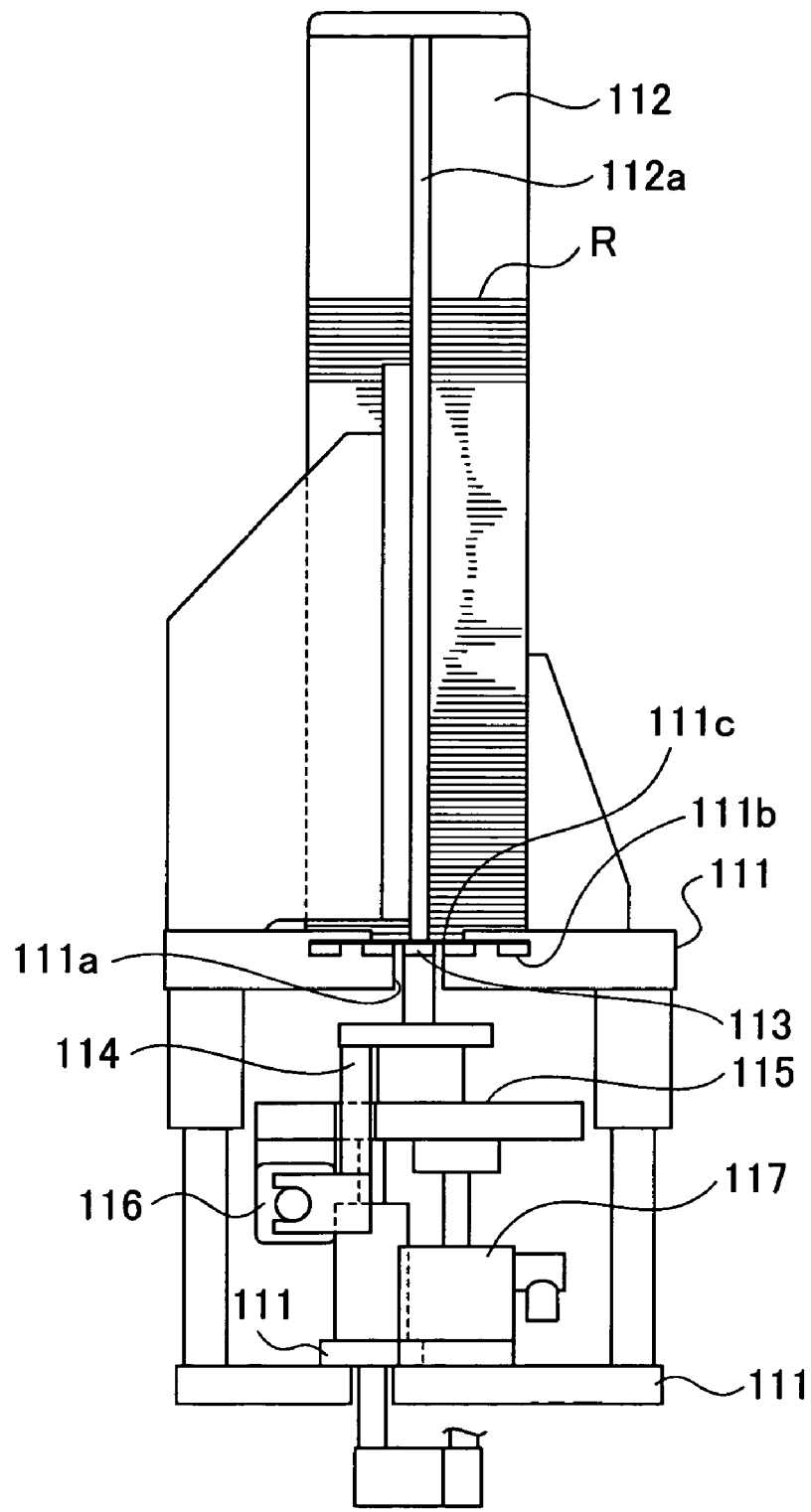
FIG. 5 is a side view showing the extruding mechanism that is a component of the device according to the present invention.
Figure 6:
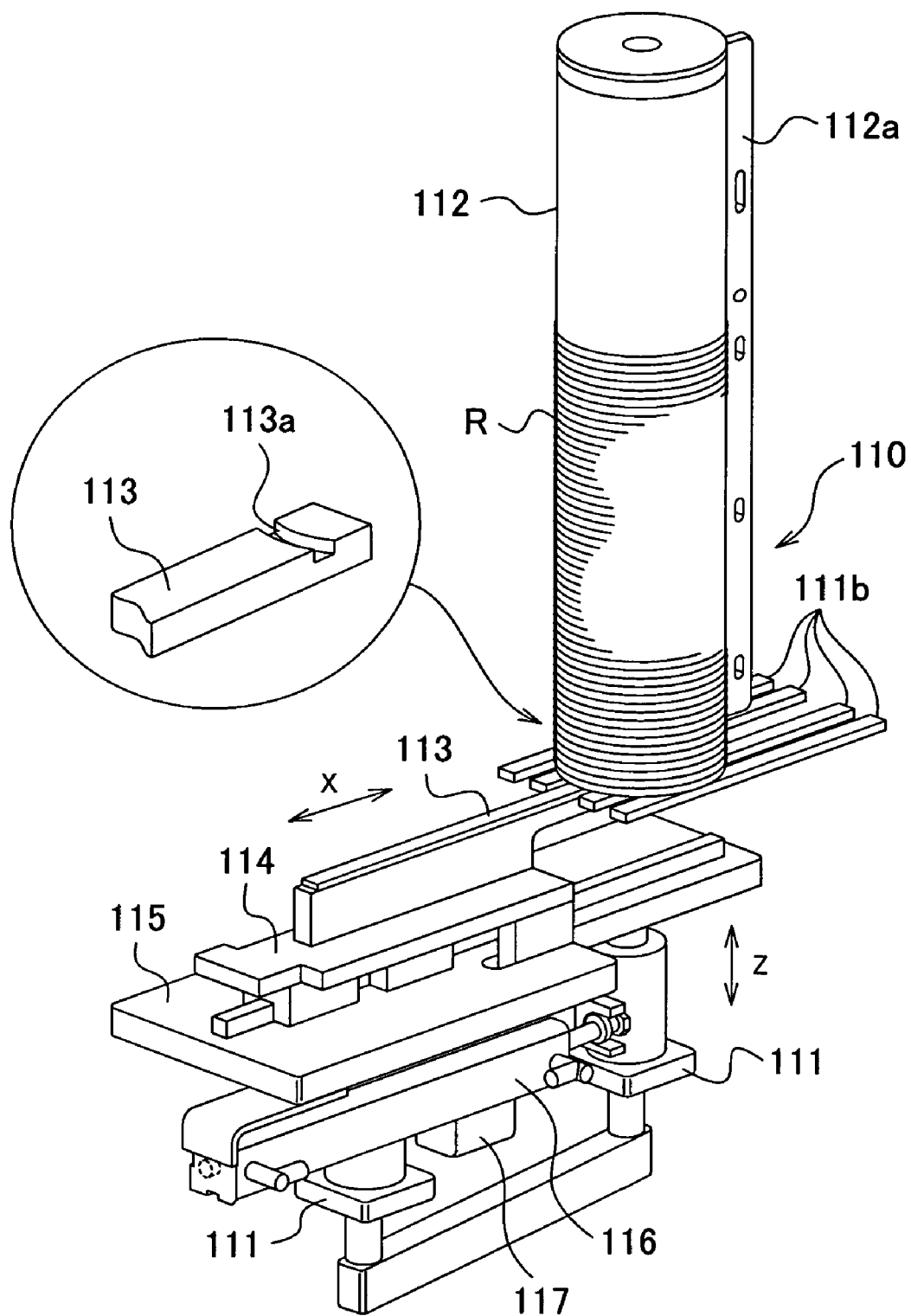
FIG. 6 is a perspective view showing the extruding mechanism that is a component of the device according to the present invention.

As shown in FIG. 4 to FIG. 6, a passage 111a along which the push-out member 113 is reciprocated is formed in the base 111. Four guide plates 111b that are superior in abrasion resistance and that smoothly guide a piston ring R are embedded in the base 111 above the passage 111a. A guide passage 111c both side parts of which are formed in the shape of a groove and that guides an extruded piston ring R is formed on the upper surfaces of the guide plates 111b.

As shown in FIG. 3 to FIG. 6, the magazine 112 is cylindrical, and has a protrusion part 112a elongated in the vertical direction Z on the outer circumferential surface of the magazine 112. The magazine 112 holds a plurality of piston rings R stacked up in the vertical direction Z in a state in which a gap between abutment joints of the piston ring R is fitted onto the protrusion part 112a and is positioned thereby.

As shown in FIG. 5 and FIG. 6, the push-out member 113 is elongated in the horizontal direction X, and is formed so as to be able to move through the passage 111a. A groove 113a deep enough to fit the piston ring R is formed in the upper surface of the forefront of the push-out member 113.

The connection member 114 is connected to the push-out member 113, and is slidably guided by the guide plate 115 in the horizontal direction X. A part of the connection member 114 is connected to the horizontally driving mechanism 116.

A main component of the horizontally driving mechanism 116 is a pneumatic or oil-hydraulic cylinder that has a rod that expands and contracts in the horizontal direction X, or is an actuator other than this cylinder. In response to actuation of the horizontally driving mechanism 116, the push-out member 113 and the connection member 114 are reciprocated together in the horizontal direction X with respect to the base 111 and the guide plate 115.

As shown in FIG. 5 and FIG. 6, a main component of the vertically driving mechanism 117 is a pneumatic or oil-hydraulic cylinder that has a rod which expands and contracts in the vertical direction Z, or is an actuator other than this cylinder. In response to actuation of the vertically driving mechanism 117, the push-out member 113, the connection member 114, and the guide plate 115 are reciprocated together in the vertical direction Z with respect to the base 111.

In the extruding mechanism 110 structured as above, the push-out member 113 moves back and then rises, so that a lowest piston ring R is fitted into the groove 113a of the push-out member 113. This state is a waiting position. From this waiting position, the horizontally driving mechanism 116 is actuated, and the push-out member 113 proceeds in the horizontal direction X, and extrudes the lowest piston ring R.

The extruded piston ring R is set at a predetermined position in the ring holding mechanism 120, and the vertically driving mechanism 117 is actuated, and the push-out member 113 is lowered in the vertical direction Z by a predetermined amount. Thereafter, the horizontally driving mechanism 116 is actuated, and the push-out member 113 moves back in the horizontal direction X to the position immediately beneath a lowest piston ring R to be next processed. Thereafter, the vertically driving mechanism 117 is actuated, and the push-out member 113 is raised in the vertical direction Z by a predetermined amount, and is returned to the waiting position (whereat a next piston ring R is fitted in the groove 113a).

When the push-out member 113 extrudes the lowest piston ring and then returns to the waiting position again, the push-out member 113 is pre-driven downwardly in the vertical direction in this way. Therefore, when the push-out member 113 moves back, the push-out member 113 can avoid coming into contact with a piston ring R waiting for the next processing at the lowest position of the magazine 112. This makes it possible to prevent the piston ring R held by the magazine 112, for example, from being deviated from the normal position. Additionally, since the extruding mechanism 110 (the push-out member 113) is driven in the horizontal direction X and in the vertical direction Z, the structure can be made simpler than is driven in an oblique direction, and a fine adjustment can be easily performed for the height position of the push-out member 113 with respect to the piston ring R, so that highly accurate positioning can be performed.

As shown in FIG. 3 and FIGS. 7 to 11, the ring holding mechanism 120 is made up of a base 121 fixed on the base 111, a pair of guide plates 122 and 123 disposed to face each other so as to move close to and apart from each other in one direction (i.e., direction Y perpendicular to the extruding direction X) intersecting with the extruding direction X of the piston ring R, a pair of movable bases 124 and 125 that fixedly carry the pair of guide plates 122 and 123, respectively, and that are driven to move close to and apart from each other in the direction Y, and a horizontally driving mechanism 126 serving as a first driving mechanism that drives the pair of movable bases 124 and 125 (the pair of guide plates 122 and 123) so as to move close to and apart from each other in the direction Y. As shown in FIG. 10A, a main component of the horizontally driving mechanism 126 is a pneumatic or oil-hydraulic cylinder that has a rod for expanding and contracting in the direction Y, or is an actuator other than this cylinder.

As shown in FIG. 7 and FIGS. 9 to 11, the base 121 is provided with two protrusion guides 121a that guide the pair of movable bases 124 and 125 so as to move close to and apart from each other in the direction Y, a stopper 121b that positions the pair of guide plates 122 and 123 at predetermined closed positions close to each other, two guide rods 121c elongated downwardly in the vertical direction, a spring 121d fitted onto each guide rod 121c, a rail 121e connected to lower parts of the guide rods 121c movably upwardly and downwardly, and a vertically driving mechanism 128 that drives the rail 121e in the vertical direction Z. As shown in FIG. 10B, a main component of the vertically driving mechanism 128 is a pneumatic or oil-hydraulic cylinder that has a rod for expanding and contracting in the vertical direction Z, or is an actuator other than this cylinder.

Figure 7:
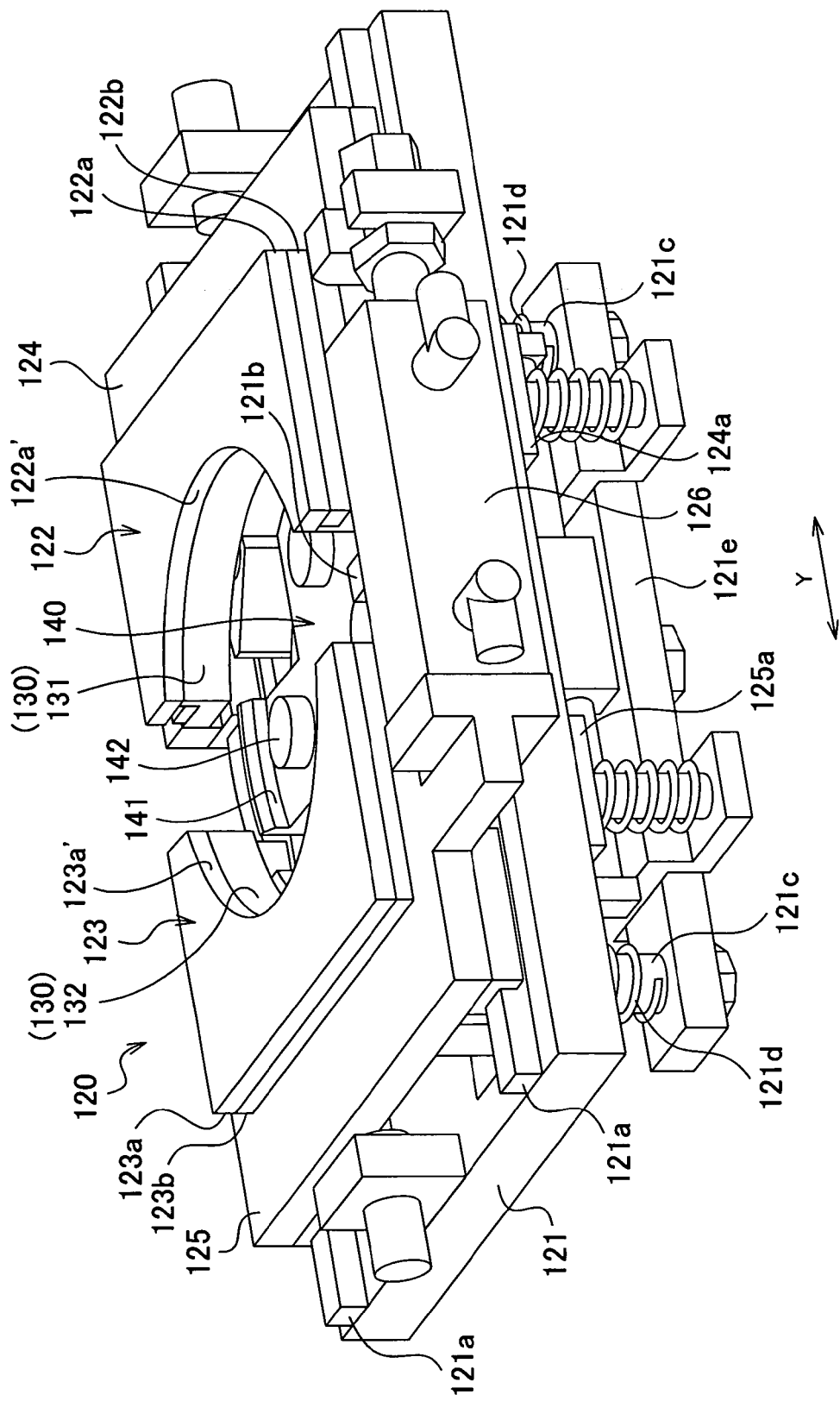
FIG. 7 is a perspective view showing a ring holding mechanism, a ring diameter extending mechanism, and a piston holding member, each of which is a component of the device according to the present invention.

As shown in FIG. 7, the piston holding member 140 that holds and positions a piston P at a predetermined installation position is fixed to the base 121. The piston holding member 140 includes a concave part 141 that receives a head of the piston P and a receiving part 142 that protrudes from the concave part 141.

As shown in FIG. 7 and FIGS. 9 to 12C, the pair of guide plates 122 and 123 are made up of upper plates 122*a* and 123*a* that respectively form substantially semicircular upper inside edge parts 122*a*' and 123*a*' and flat upper guide surfaces 122*a*" and 123*a*", and lower plates 122*b* and 123*b* that respectively form substantially semicircular lower inside edge parts 122*b*' and 123*b*' greater in radius of curvature than the upper inside edge parts 122*a*' and 123*a*' and flat lower guide surfaces 122*b*" and 123*b*".

An insertion hole into which the piston P is inserted is defined in the center area of the pair of guide plates 122 and 123 by means of the upper inside edge parts 122*a*' and 123*a*'. Additionally, a guide passage that holds and guides an extruded piston ring R is defined by the upper guide surfaces 122*a*" and 123*a*" and the lower guide surfaces 122*b*" and 123*b*".

Connection members 124*a* and 125*a* connected so as to move together in the direction Y are respectively disposed under the pair of movable bases 124 and 125.

The connection members 124*a* and 125*a* serve to guide a pair of diameter extending members 131 and 132, described later, movably in the vertical direction Z, and serve to move these diameter extending members together with the movable bases 124 and 125, respectively, in the direction Y (i.e., in the horizontal direction).

Figure 10A:
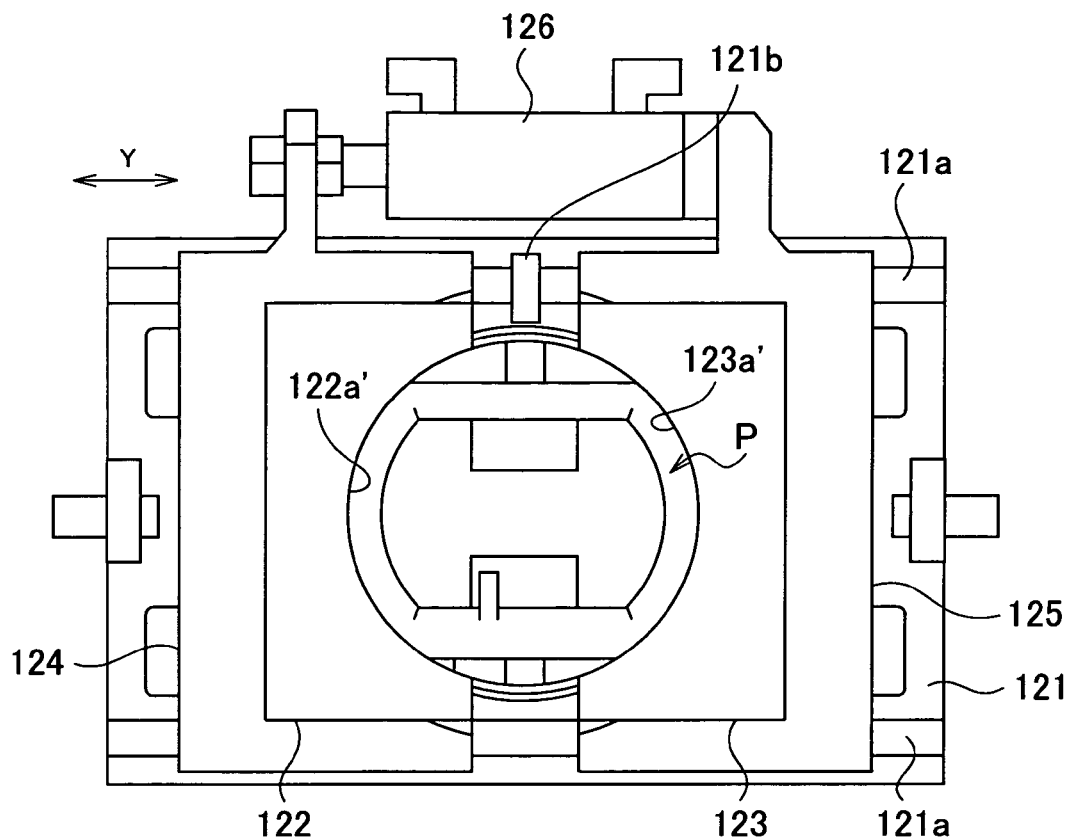
FIG. 10A is a plan view showing a state in which the piston has been inserted and held in the ring holding mechanism.
Figure 10B:
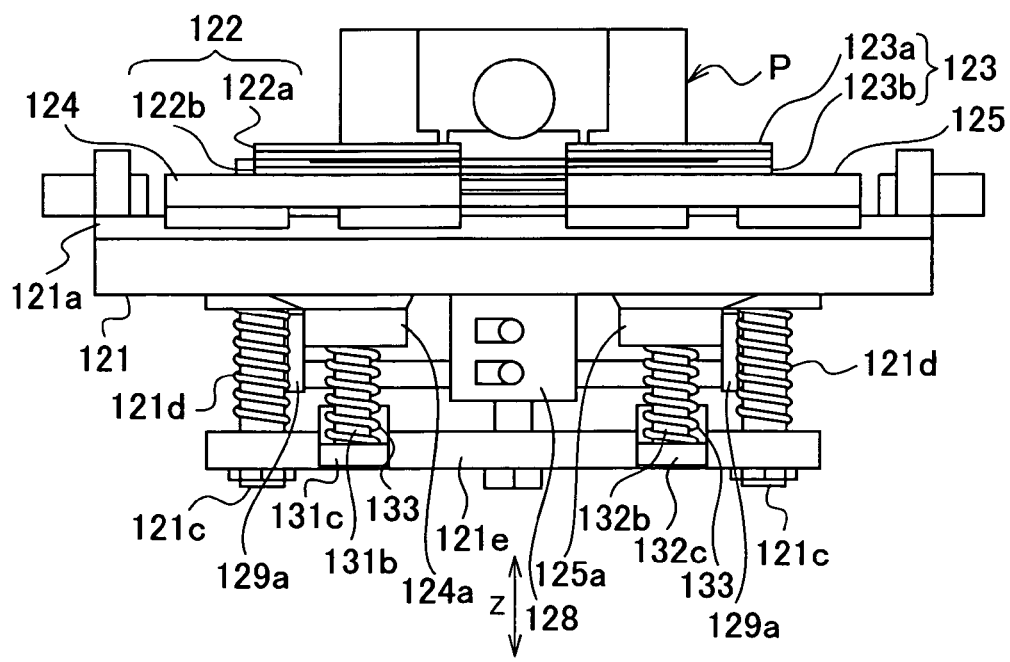
FIG. 10B is a front view showing a state in which the piston has been inserted and held in the ring holding mechanism.
Figure 11:
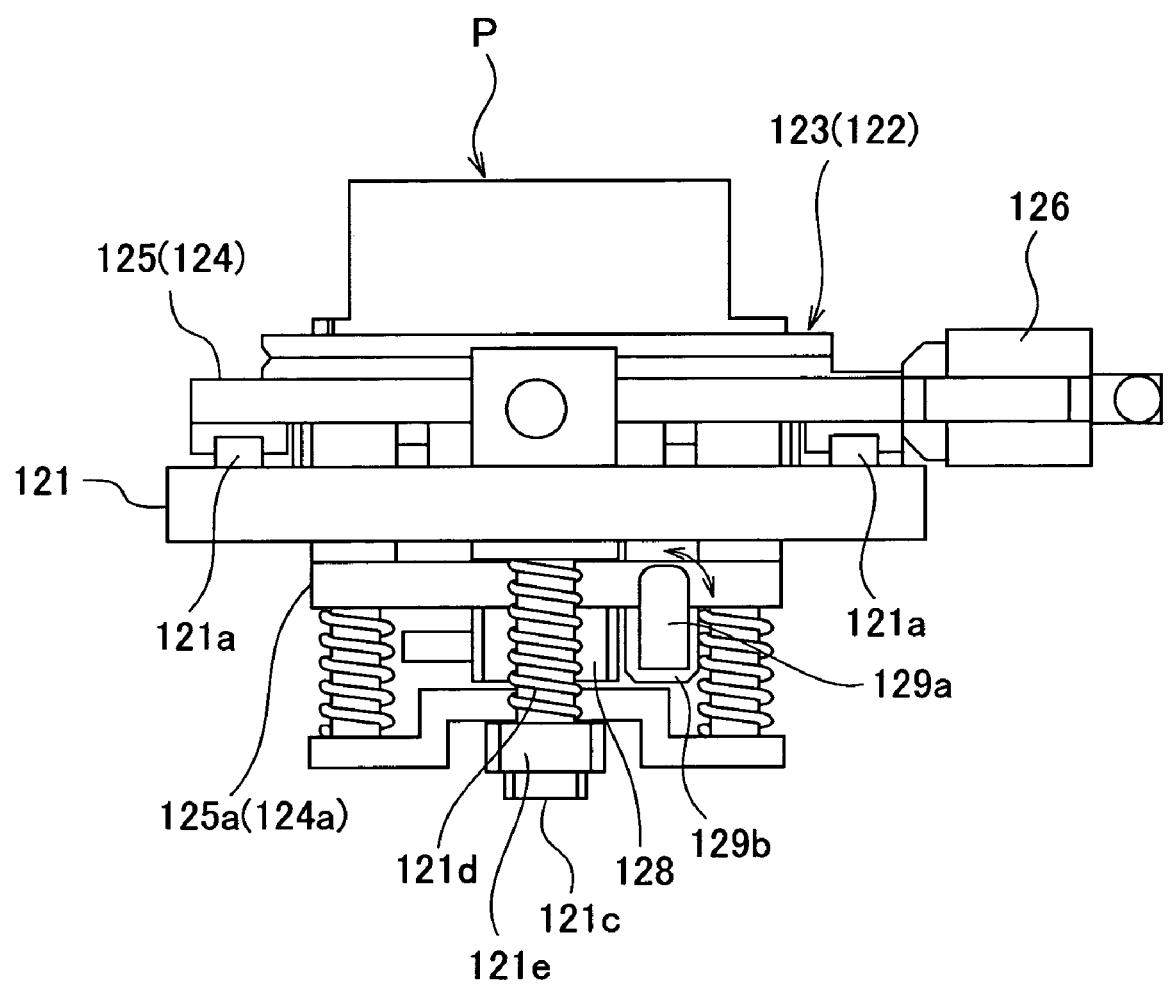
FIG. 11 is a side view showing a state in which the piston has been inserted and held in the ring holding mechanism.

As shown in FIG. 10B and FIG. 11, two stoppers 129*a* that constrain the connection members 124*a* and 125*a* to predetermined positions in order to hold the pair of guide plates 122 and 123 at the closed position (a state in which a piston ring R is fitted into a ring groove G) and a rotation driving mechanism 129*b* that rotationally drives the two stoppers 129*a* are disposed under the base 121.

In this structure, in response to actuation of the horizontally driving mechanism 126, the pair of guide plates 122 and 123 (and, in addition, the pair of movable bases 124 and 125) are driven reciprocatively so as to move close to and apart from the base 121 in the direction Y.

Additionally, in response to actuation of the vertically driving mechanism 128, the rail 121*e* rises while acting against the urging force of the spring 121*d*. On the other hand, when the operation of the vertically driving mechanism 128 is stopped, the rail 121*e* is lowered by the urging force of the spring 121*d*.

When a piston ring R is installed, the rotation driving mechanism 129*b* is actuated in one direction, whereby the stoppers 129*a* are hooked on the connection members 124*a* and 125*a* so as to constrain the pair of guide plates 122 and 123 from moving apart from each other. After the piston ring R is installed, the rotation driving mechanism 129*b* is actuated in the other direction, whereby the constraint by the stoppers 129*a* is released so as to allow the pair of guide plates 122 and 123 to move apart from each other.

As shown in FIG. 8 to FIG. 12C, the ring diameter extending mechanism 130 is made up of the above-described horizontally driving mechanism 126 serving as a second driving mechanism that drives the pair of diameter extending members 131 and 132 so as to move close to and apart from each other in the direction Y and the above-described vertically driving mechanism 128 serving as a third driving mechanism that drives the pair of diameter extending members 131 and 132 so as to be able to freely enter and leave the guide passage in the vertical direction Z perpendicular to the guide surfaces 122*a*" and 123*a*" (122*b*", 123*b*").

That is, the horizontally driving mechanism 126 (first driving mechanism) that drives the pair of guide plates 122 and 123 so as to move close to and apart from each other is also used as the driving mechanism (second driving mechanism) that drives the pair of diameter extending members 131 and 132 so as to move close to and apart from each other. Therefore, this structure can be made simpler than a structure in which the driving mechanisms are not combined but are rather provided individually, so that the device can be reduced in size. Additionally, the pair of diameter extending members 131 and 132 and the pair of guide plates 122 and 123 are allowed to reliably synchronously move close to and apart from each other in the horizontal direction Y.

Figure 8:
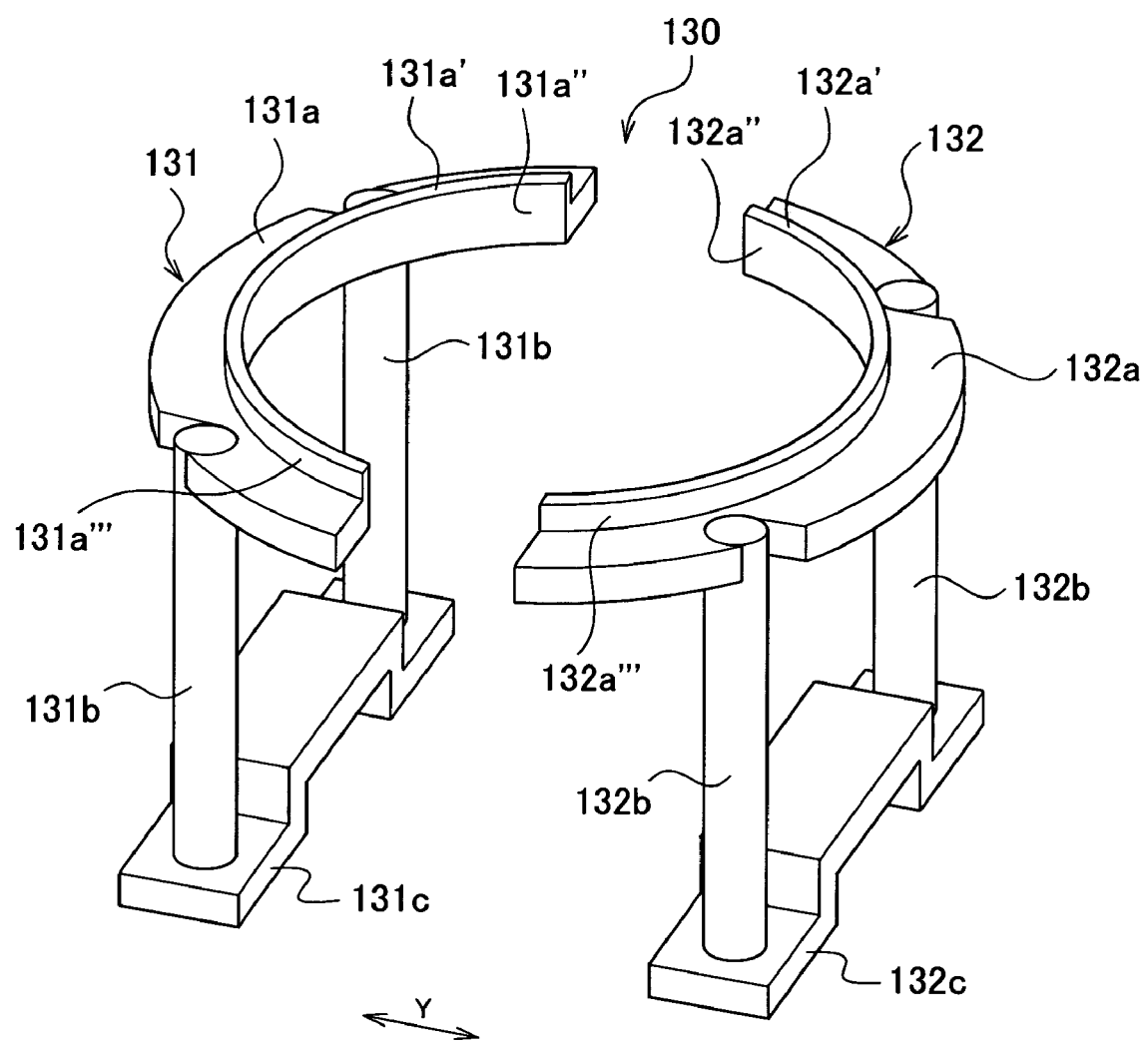
FIG. 8 is a perspective view showing a pair of diameter extending members each of which is a part of the ring diameter extending mechanism.
Figure 9:
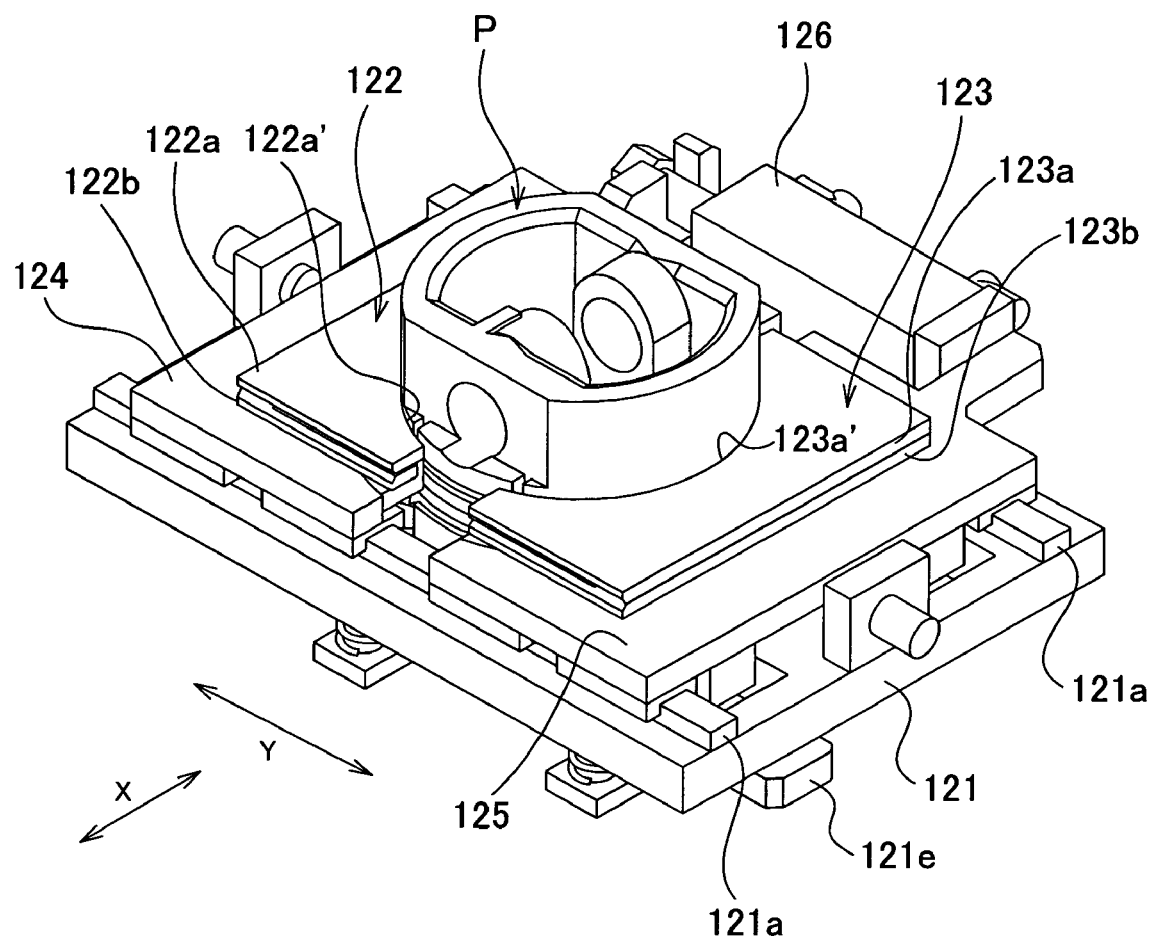
FIG. 9 is a perspective view showing a state in which a piston has been inserted and held in the ring holding mechanism.

As shown in FIG. 7, FIG. 8, and FIG. 10B, the pair of diameter extending members 131 and 132 are made up of arc-shaped members 131*a* and 132*a* each of which has a substantially semicircular arc shape and a part of each of which is projected upwardly, rods 131*b* and 132*b* that support the arc-shaped members 131*a* and 132*a* and that are respectively slidably inserted into the connection members 124*a* and 125*a*, movable bars 131*c* and 132*c* that are respectively connected to the lower ends of the rods 131*b* and 132*b*, and that are slid on a rail 124*e* in the horizontal direction Y, and springs 133 that are fitted onto the rods 131*b* and 132*b* and that are disposed in a state of being compressed between the connection members 124*a*, 125*a* and the movable bars 131*c*, 132*c*, respectively.

As shown in FIG. 8 and FIGS. 12A to 12C, the arc-shaped members 131*a* and 132*a* have upper end parts 131*a*' and 132*a*' capable of coming into contact with the upper guide surfaces 122*a*" and 123*a*" of the upper plates 122*a* and 123*a*, respectively, semicylindrical inner wall surfaces 131*a*" and 132*a*" that are flush with the upper inside edge parts 122*a*' and 123*a*' of the upper plates 122*a* and 123*a*, respectively, and by which the insertion hole of a piston P is defined, and outer wall surfaces 131*a*'" and 132*a*'" capable of coming into contact with the inner surface of a piston ring R.

The pair of diameter extending members 131 and 132 are supported so that the outer wall surfaces 131*a*'" and 132*a*'" thereof are movable in the vertical direction Z with respect to the pair of guide plates 122 and 123 in a state of being adjacent to the lower edges 122*b*' and 123*b*' of the lower plates 122*b* and 123*b*, i.e., so that the upper end parts 131*a*' and 132*a*' thereof are proceedable to and recedable from the guide passage.

In the ring diameter extending mechanism 130, in the waiting state, the urging force of the springs 121*d* and 133 acts. As a result, the pair of diameter extending members 131 and 132 are located at the position receding from the guide passage of the pair of guide plates 122 and 123 (i.e., being flush with the lower guide surfaces 122*b*" and 123*b*") as shown in FIG. 12B and FIG. 12C. When the vertically driving mechanism 128 is actuated, the pair of diameter extending members 131 and 132 rise (proceed) against the urging force of the springs 121*d* and 133, and the upper end parts 131*a*' and 132*a*' come into contact with the upper guide surfaces 122*a*" and 123*a*", thus reaching a state in which the inner surface of the piston ring R can be constrained.

Figure 12A:
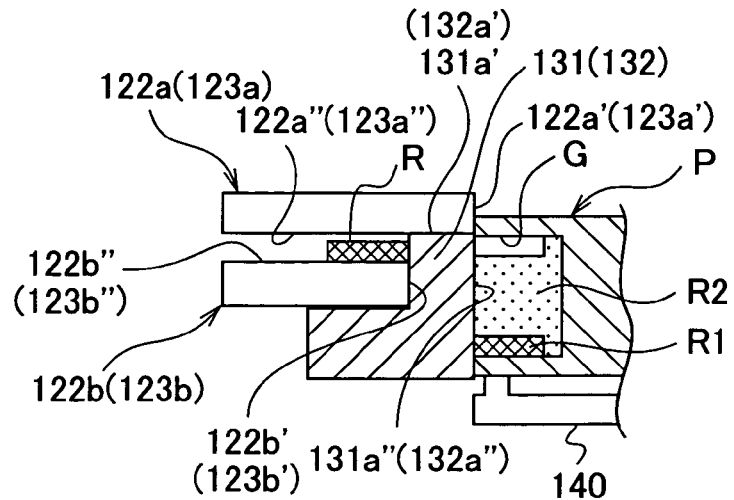
FIG. 12A to FIG. 12C are operational views, each showing an operation in which a diameter extending state created by the diameter extending member is released, so that a piston ring is inserted into a ring groove.
Figure 12B:
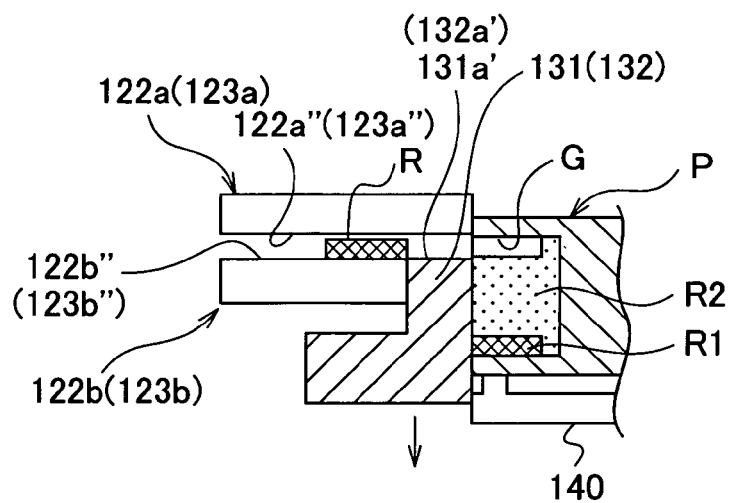
Figure 12C:
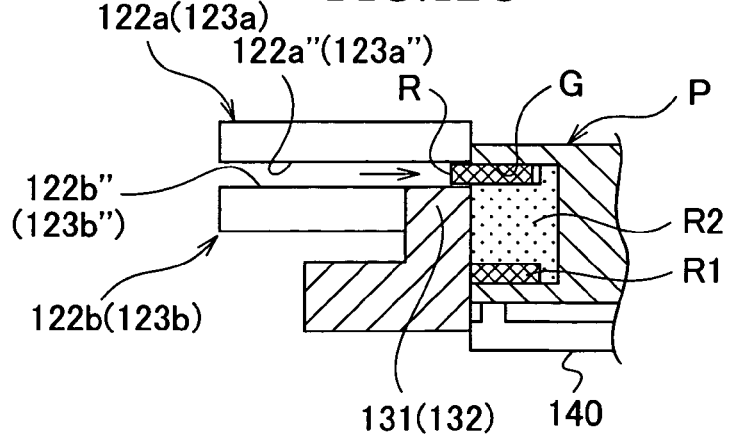

In other words, in the ring holding mechanism 120 and the ring diameter extending mechanism 130, the piston P (in this embodiment, two piston rings, i.e., one rail ring R1 of the two rail rings and an expander ring R2, have already been fitted onto the piston P) is inserted into the insertion hole and is positioned on the piston holding member 140 as shown in FIG. 12A, and the piston ring (the other rail ring) R is released from the extended state of its diameter when the pair of diameter extending members 131 and 132 are lowered to recede from the guide passage as shown in FIG. 12B. At this time, the guide passage of the piston ring R is always surrounded by the upper guide surfaces 122*a*" and 123*a*", the lower guide surfaces 122*b*" and 123*b*", and the upper end parts 131a' and 132a'. Therefore, as shown in FIG. 12C, the piston ring R is reliably guided to the ring groove G along the guide passage without being deviated, and is automatically installed with high accuracy.

Figure 13A:
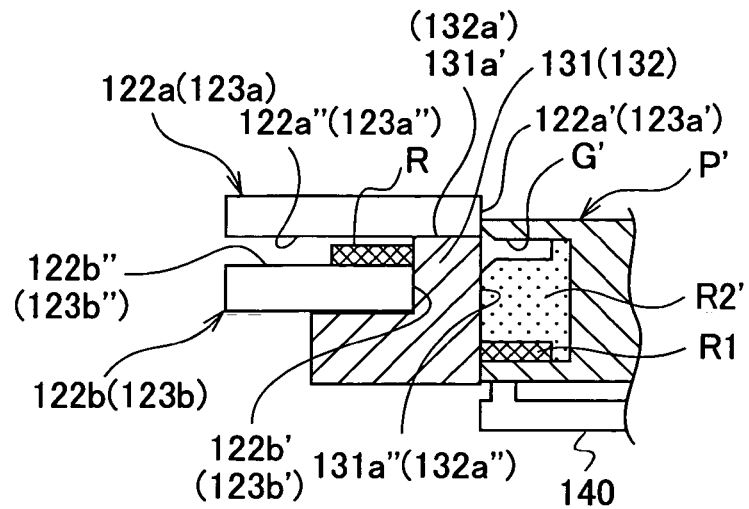
FIG. 13A to FIG. 13C are operational views, each showing an operation in which, in another embodiment, a diameter extending state created by the diameter extending member is released, so that a piston ring is inserted into a ring groove.
Figure 13B:
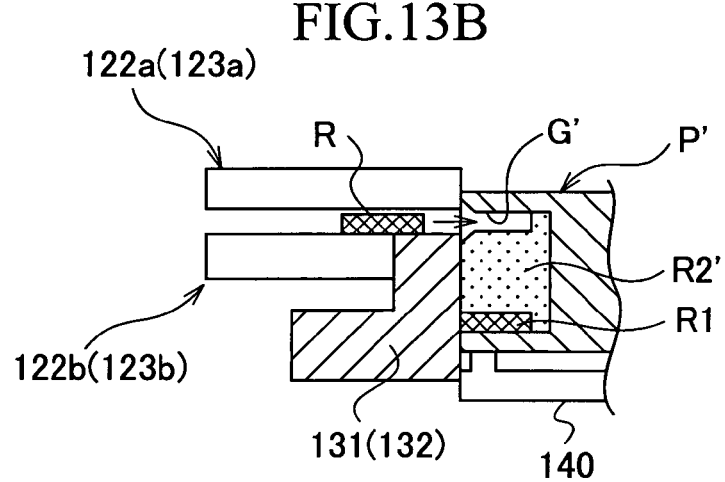
Figure 13C:
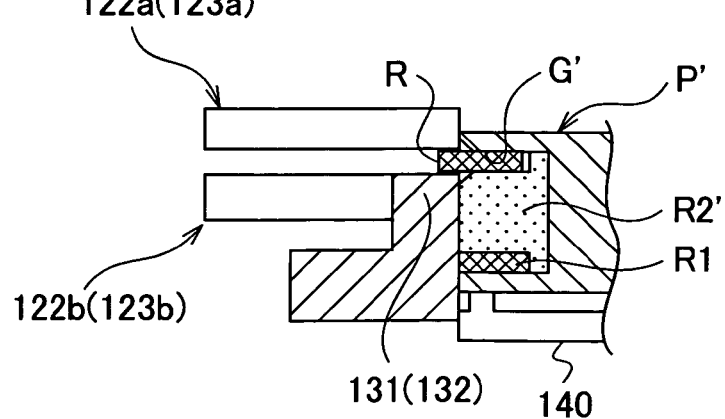

The above embodiment shows an example in which the ring groove G of the piston P and the edge of the expander ring R2 are not chamfered. However, even if a ring groove G' of a piston P' and an expander ring R2' have been chamfered as shown in FIG. 13A to FIG. 13C, the piston ring R can be fitted into the ring groove G' with higher accuracy and with ease by applying the present invention in the same way.

Next, the whole operation of the piston-ring-installing device will be described with reference to FIG. 14A to FIG. 15D. It is to be noted that, herein, the first ring, the second ring, and one rail ring R1 and the expander ring R2 that are components of the oil ring have already been fitted onto the piston P.

First, in a waiting state, the pair of guide plates 122 and 123 are located to be completely open, and the pair of diameter extending members 131 and 132 are located to recede (descend) from the guide passage.

Figures 14A, 14B, 14C, 14D:
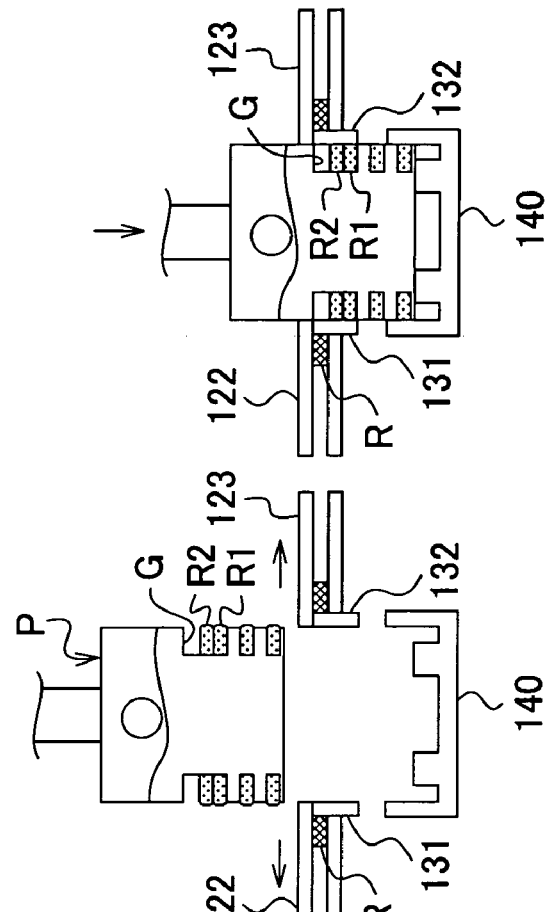
FIG. 14A to FIG. 14D are operational views, each showing an operation in which a piston ring is installed into a ring groove of a piston.

The horizontally driving mechanism 126 is actuated in this state, and, when the pair of guide plates 122 and 123 are positioned at a predetermined position so as to become close to each other, preparation to receive the piston ring R is completed as shown in FIG. 14A.

Thereafter, the extruding mechanism 110 (the push-out member 113) is actuated, and the lowest piston ring R is extruded (cut out). This piston ring R is set at a predetermined position in the guide passage defined by the pair of guide plates 122 and 123 as shown in FIG. 14B. The push-out member 113 is pre-moved by a predetermined amount downwardly in the vertical direction Z, is then moved backwardly in the horizontal direction X, and is again raised to return to the waiting position (extruding step).

Thereafter, the vertically driving mechanism 128 is actuated, and the pair of diameter extending members 131 and 132 are raised. Thereafter, the horizontally driving mechanism 126 is actuated, and the pair of diameter extending members 131 and 132 are moved apart from each other together with the pair of guide plates 122 and 123 as shown in FIG. 14C, so that the insertion hole of the piston P is defined, and, at the same time, the piston ring R is extended (ring diameter extending step).

Thereafter, the elevating mechanism 50 is actuated, and the piston P conveyed by the conveyer 12 is lowered. The piston P is placed on the piston holding member 140 as shown in FIG. 14D, and, at the same time, the horizontally driving mechanism 126 is actuated. In response to actuation of the horizontally driving mechanism 126, the pair of guide plates 122 and 123 are moved slightly close to each other, and the pair of diameter extending members 131 and 132 are also moved slightly close to each other. Thereafter, the rotation driving mechanism 129b is actuated, and the stopper 129a constrains its state, so that the piston P is firmly fastened (piston positioning step).

Thereafter, the driving force of the vertically driving mechanism 128 is released. In response thereto, the pair of diameter extending members 131 and 132 are lowered by the urging force of the springs 121d and 133 by a predetermined amount, and recede from the guide passage as shown in FIG. 15A. As a result, the diameter-extended state is released, and the piston ring R moves toward the ring groove G by its elastic restoring force. At this time, the guide passage of the piston ring R is maintained to be always surrounded by the upper guide surfaces 122a" and 123a", the lower guide surfaces 122b" and 123b", and the upper end parts 131a' and 132a' as shown in FIG. 12B. Therefore, the piston ring R is guided along the guide passage without being deviated, and is reliably fitted into the ring groove G, thereby completing the ring installing operation (ring inserting step).

Thereafter, in response to actuation of the rotation driving mechanism 129b, the state constrained by the stopper 129a is released, and, in response to actuation of the horizontally driving mechanism 126, the pair of guide plates 122 and 123 and the pair of diameter extending members 131 and 132 are moved apart from each other by a predetermined amount as shown in FIG. 15B, so that the piston P becomes free. Thereafter, in response to actuation of the elevating mechanism 50, the piston P is raised to the height position to be conveyed as shown in FIG. 15C, and the device returns to the first waiting state.

Thereafter, in response to actuation of the horizontally driving mechanism 126, the pair of guide plates 122 and 123 and the pair of diameter extending members 131 and 132 approach a predetermined position for preparation for the next ring-extruding operation as shown in FIG. 15D. In this device, these operations are continuously performed.

Figure 16A:
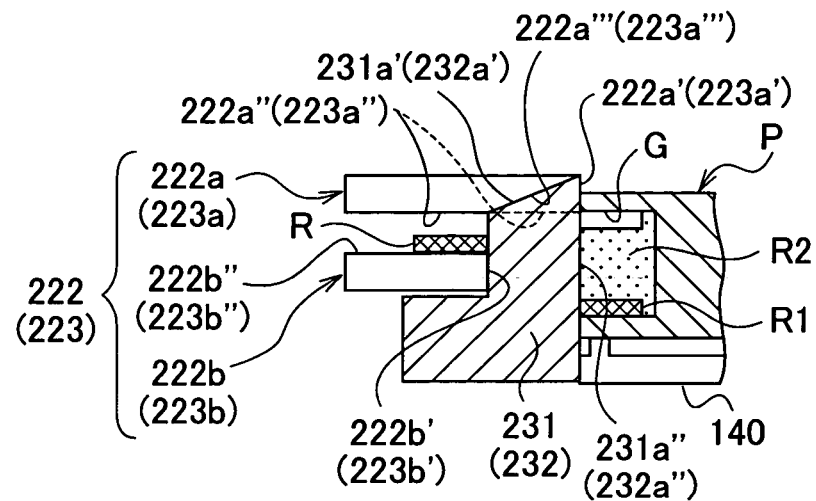
FIG. 16A to FIG. 16C are operational views, each showing an operation in which, in still another embodiment, a diameter extending state created by the diameter extending member is released, so that a piston ring is inserted into a ring groove.
Figure 16B:
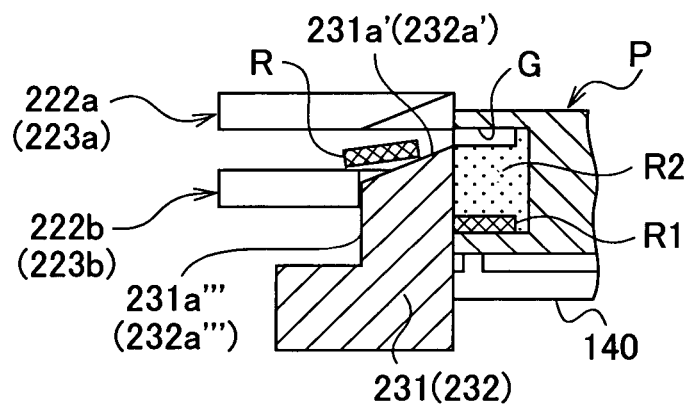
Figure 16C:
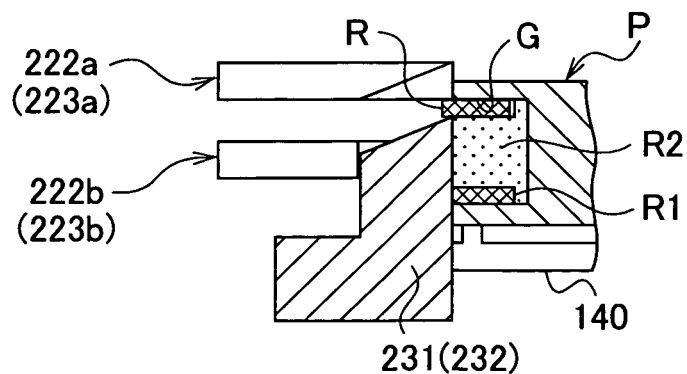
Figure 17:
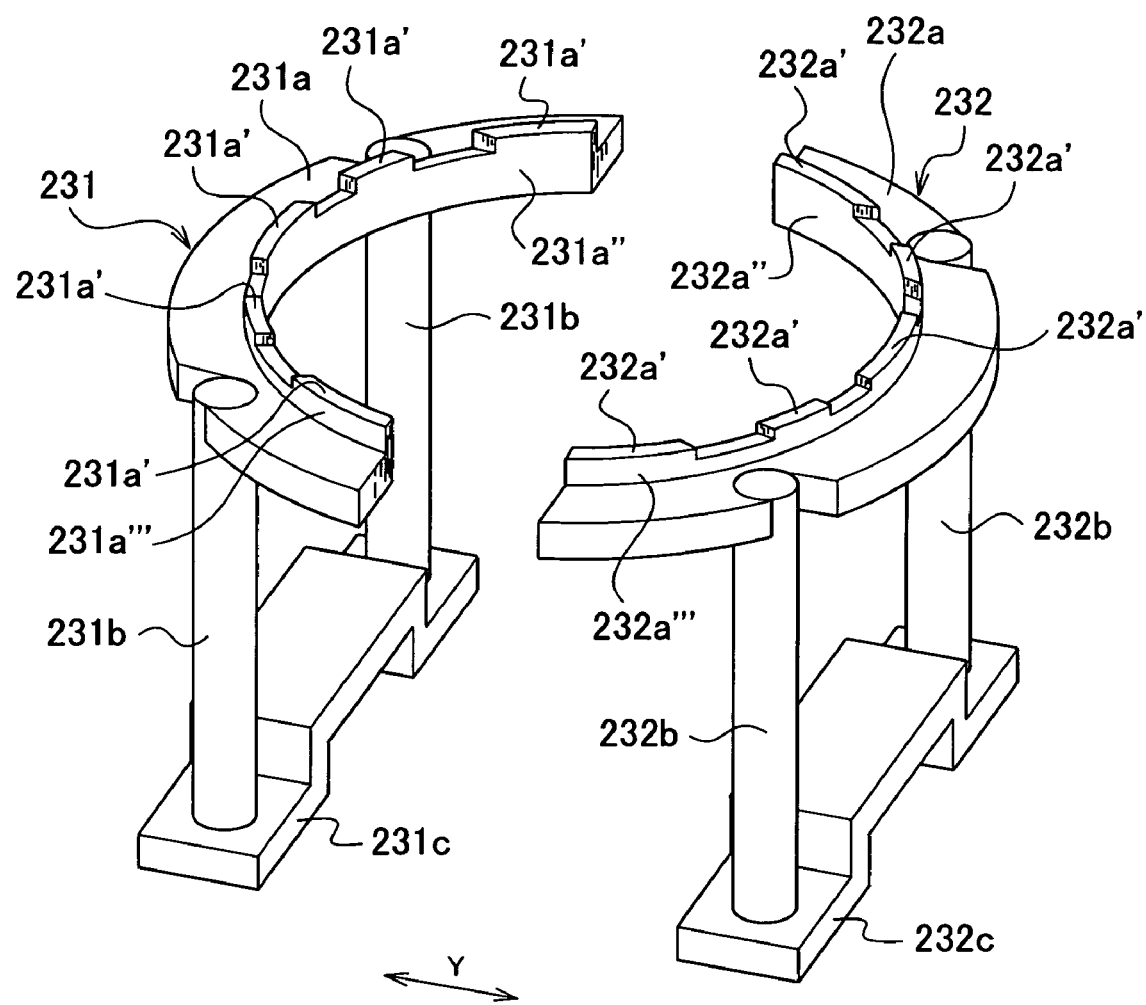
FIG. 17 is a perspective view showing another embodiment of the diameter extending member.

FIG. 16A to FIG. 17 show another embodiment of the device according to the present invention. The same reference character is given to the same structure as in the above-described embodiment, and a description of the same structure is omitted.

In detail, in this embodiment, the pair of guide plates 222 and 223 are made up of upper plates 222a and 223a, which form substantially semicircular upper inside edge parts 222a' and 223a', flat upper guide surfaces 222a" and 223a", and slantingly-cut groove-like concave parts 222a'" and 223a'", and lower plates 222b and 223b, which form substantially semicircular lower inside edge parts 222b' and 223b' that are greater in radius of curvature than the upper inside edge parts 222a' and 223a' and flat lower guide surfaces 222b" and 223b", respectively, as shown in FIG. 16A to FIG. 16C.

In this embodiment, the height of the guide passage defined by the upper guide surfaces 222a" and 223a" and the lower guide surfaces 222b" and 223b" is formed to be slightly greater than the thickness of the piston ring R.

On the other hand, as shown in FIG. 16A to FIG. 17, the pair of diameter extending members 231 and 232 are made up of arc-shaped members 231a and 232a each of which has a substantially semicircular arc shape and a part of each of which is projected upwardly, rods 231b and 232b that support the arc-shaped members 231a and 232a and that are slidably inserted into the connection members 124a and 125a, respectively, movable bars 231c and 232c that are connected to the lower ends of the rods 231b and 232b, respectively, and that are slid on the rail 124e in the horizontal direction Y, and the springs 133 described above.

The arc-shaped members 231a and 232a have upper end parts 231a' and 232a' that have slanting surfaces fittable into the concave parts 222a'" and 223a'" formed in the upper guide surfaces 222a" and 223a" of the upper plates 222a and 223a, respectively, semicylindrical inner wall surfaces 231a" and 232a" that are flush with the upper inside edge parts 222a' and 223a' of the upper plates 222a and 223a, respectively, and by which the insertion hole of a piston P is defined, and outer wall surfaces 231a'" and 232a'" capable of coming into contact with the inner surface of a piston ring R.

As shown in FIG. 16A, the upper end parts 231a' and 232a' of the pair of diameter extending members 231 and 232 are engaged with the upper plates 222a and 223a in a state in which the pair of diameter extending members 231 and 232 are projected into the guide passage. When the pair of diameter extending members 231 and 232 are lowered by a predetermined amount, the slanting surfaces of the upper end parts 231a' and 232a' guide the piston ring R toward the ring groove G as shown in FIG. 16B.

Accordingly, as shown in FIG. 16C, the piston ring R whose diameter-extended state has been released is guided to the ring groove G along the upper end parts 231a' and 232a', and is reliably fitted thereinto.

Figure 18:
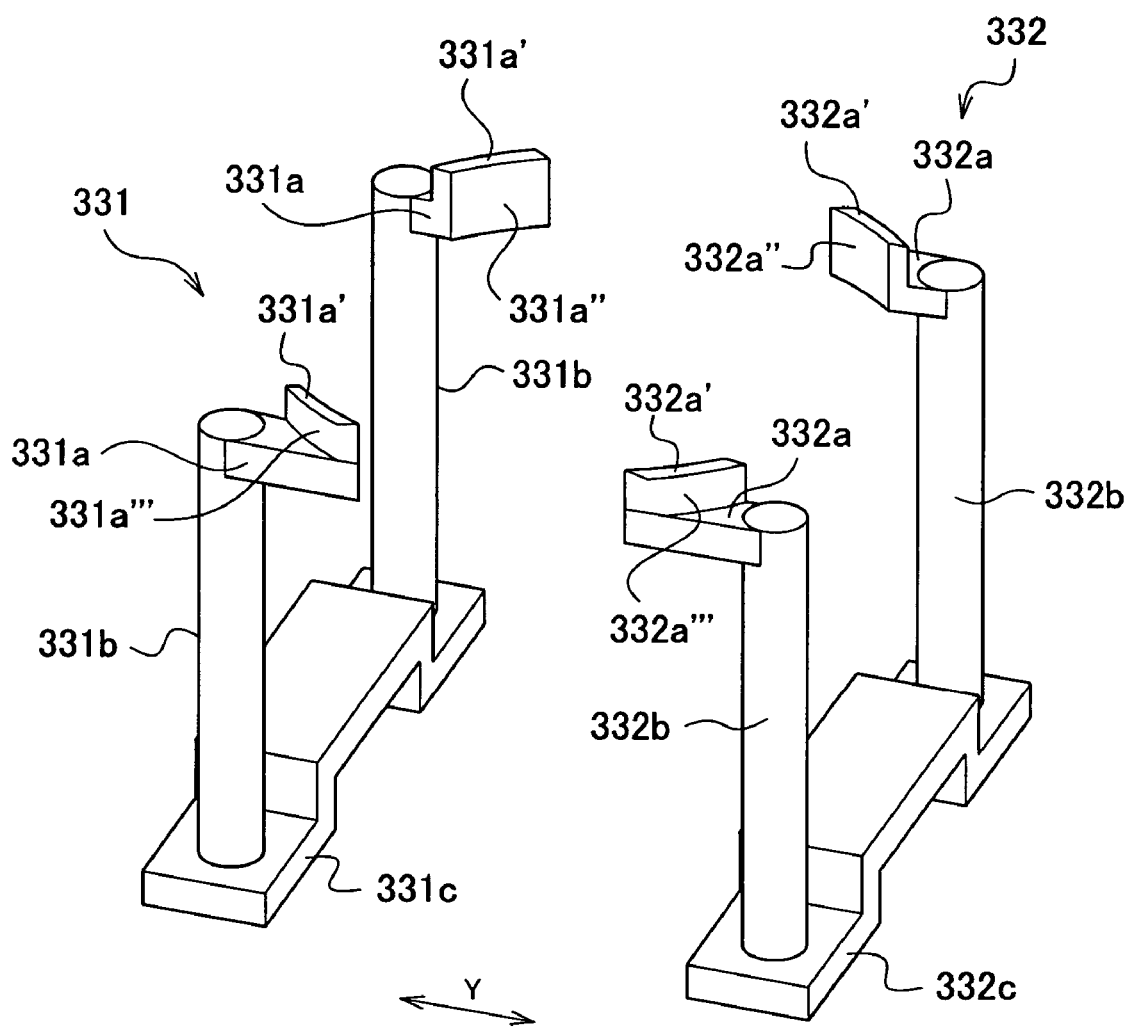
FIG. 18 is a perspective view showing still another embodiment of the diameter extending member.

FIG. 18 shows still another embodiment of the device according to the present invention. In this embodiment, as shown in FIG. 18, the pair of diameter extending members 331 and 332 are made up of arc-shaped members 331a and 332a that are respectively bisected, and a part of each of which is projected upwardly, rods 331b and 332b that support the arc-shaped members 331a and 332a and that are respectively slidably inserted into the connection members 124a and 125a, movable bars 331c and 332c that are respectively connected to the lower ends of the rods 331b and 332b, and that are slid on the rail 124e in the horizontal direction Y, and the springs 133 described above.

The arc-shaped members 331a and 332a have upper end parts 331a' and 332a' capable of coming into contact with the upper guide surfaces 222a'' and 223a'' of the upper plates 222a and 223a, respectively, circularly arc-shaped inner wall surfaces 331a'' and 332a'' that are flush with the upper inside edge parts 222a' and 223a' of the upper plates 222a and 223a, respectively, and by which the insertion hole of a piston P is defined, and outer wall surfaces 331a''' and 332a''' capable of coming into contact with the inner surface of a piston ring R.

Even when the pair of diameter extending members 331 and 332 structured in this way are used, the diameter of the piston ring R is reliably extended, and the diameter-extended state of the piston ring R is reliably released, so that the piston ring R can be reliably fitted into the ring groove G as shown in FIG. 12A to FIG. 12C.

As described above, according to the installation device and the installation method for a piston ring of the present invention, when the push-out member 113 extrudes (cuts out) a lowest piston ring and returns to the waiting position, the push-out member 113 is pre-driven downwardly in the vertical direction. Therefore, the push-out member 113 can avoid coming into contact with a piston ring R waiting for the next processing at the lowest part of the magazine 112, and hence the piston ring R held by the magazine 112 can be prevented from, for example, being deviated.

Additionally, since the extruding mechanism 110 is driven in the horizontal direction X and in the vertical direction Z, the structure can be made simpler than if driven in the oblique direction, and a fine adjustment can be easily performed for the height position of the push-out member 113 with respect to a piston ring R, thereby making it possible to perform highly accurate positioning.

Still additionally, since the pair of guide plates 122, 123, 222, and 223 are reciprocated only in one direction, the structure can be simplified, and the device can be reduced in size. Still additionally, since the ring diameter extending mechanism 130 can freely enter and leave the guide passage formed by the pair of guide plates 122, 123, 222, and 223, the guide passage of a piston ring R is always maintained (secured). Hence, the piston ring R can be reliably fitted into the ring groove G without being deviated from the normal position.

As described above, according to the installation device and the installation method for a piston ring of the present invention, piston rings can be installed to a piston of an internal combustion engine at high speed, in an automatic manner, and with high accuracy. Hence, the device and the method of the present invention are useful in, for example, an automatic assembly line of an internal combustion engine.

What is claimed is:

1. An installation device for a piston ring, comprising:
   an extruding mechanism that horizontally extrudes a piston ring occupying a lowest position among piston rings held and stacked up and then positions the piston ring at a predetermined position, the extruding mechanism being driven downwardly in a vertical direction by a predetermined amount after extruding the piston ring and then driven to return to a waiting position;
   a ring holding mechanism that has a guide passage used to guide the piston ring extruded by the extruding mechanism while holding the piston ring in such a way as to sandwich the piston ring from upward and downward directions, the ring holding mechanism being driven so as to move close to and apart from a piston in one direction intersecting with an extruding direction, and being capable of defining an insertion hole into which the piston is inserted in a center area thereof;
   a ring diameter extending mechanism that extends a diameter of the piston ring held by the ring holding mechanism while being in contact with an inner surface of the piston ring, the ring diameter extending mechanism being driven to freely enter and leave the guide passage defined by the ring holding mechanism, and being driven to recede toward a position defining a part of the guide passage when an extended state of the piston ring is released; and
   a piston holding member that holds the piston inserted into the insertion hole at a predetermined position.

2. The installation device for a piston ring according to claim 1, wherein the extruding mechanism includes:
   a push-out member that pushes out a piston ring occupying a lowest position among piston rings stacked up;
   a horizontally driving mechanism that drives reciprocatively the push-out member in a horizontal direction; and
   a vertically driving mechanism that drives reciprocatively the push-out member in a vertical direction.

3. The installation device for a piston ring according to claim 2, wherein the push-out member has a groove that is formed in an upper surface of a forward end thereof to receive a piston ring.

4. The installation device for a piston ring according to claim 1, wherein the ring holding mechanism includes:
   a pair of guide plates that are disposed to face each other in a direction perpendicular to the extruding direction in which a piston ring is extruded and that have guide surfaces, respectively, defining substantially semicircle inside edge parts at end surfaces facing each other and defining the guide passage while facing each other in upward and downward directions with a predetermined interval therebetween; and
   a first driving mechanism that drives the pair of guide plates so as to move close to each other and apart from each other in one direction.

5. The installation device for a piston ring according to claim 4,
   wherein each of the pair of guide plates includes
   an upper plate that forms an upper guide surface serving as a part of the guide passage and an upper inside edge part serving as a part of the insertion hole, and
   a lower plate that forms a lower guide surface serving as a part of the guide passage and a lower inside edge part greater in radius of curvature than the upper inside edge part; and
   wherein the ring diameter extending mechanism includes
   a pair of diameter extending members that are capable of coming into contact with the upper guide surfaces of the upper plates, that are disposed adjacent to the lower edge parts of the lower plates so as to serve as a part of the insertion hole while being flush with the upper inside edge parts, that are supported so as to be movable in a direction in which the pair of guide plates are moved close to and apart from each other, and that are supported so as to be able to protrude and retreat from the lower guide surface, a second driving mechanism that drives the pair of diameter extending members so as to move close to and apart from each other, and a third driving mechanism that drives the pair of diameter extending members so as to protrude and retreat from the guide surface in a direction perpendicular to the guide surface.

6. The installation device for a piston ring according to claim 5, wherein the second driving mechanism is also used as the first driving mechanism.

7. The installation device for a piston ring according to claim 5, wherein the pair of diameter extending members include upper end parts that are formed to be engaged with the upper plates and that define slanting surfaces used to guide a piston ring toward a ring groove.

8. An installation method for a piston ring, comprising:

an extruding step of extruding a lowest piston ring, occupying a lowest position among piston rings held and stacked up, by means of a push-out member along a guide passage toward a predetermined position in a horizontal direction and pre-moving the push-out member downwardly in a vertical direction by a predetermined amount when the push-out member is returned to a waiting position;

a ring diameter extending step of, following the extruding step, extending a diameter of the piston ring held in such a way as to be sandwiched from upward and downward directions by a diameter extending member;

a piston positioning step of, following the ring diameter extending step, positioning a ring groove of a piston at a predetermined position; and a ring inserting step of, following the piston positioning step, allowing the diameter extending member to recede from the guide passage so as to release an extended state of the piston ring and inserting the piston ring into the ring groove while the piston ring is guided by the guide passage.

\* \* \* \* \*